(12) United States Patent
Phelan et al.

(10) Patent No.: US 9,657,120 B1
(45) Date of Patent: May 23, 2017

(54) CYANOACRYLATE COMPOSITIONS

(75) Inventors: Marisa Phelan, County Tipperary (IE); Cormac Duffy, County Louth (IE); John Killoran, Dublin (IE); Barry N. Burns, Dublin (IE); John Guthrie, Naas (IE); Bernard Ryan, Scholarstown Road (IE); Ciara Goff, Dublin (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 13/226,184

(22) Filed: Sep. 6, 2011

(51) Int. Cl.
| | | |
|---|---|---|
| *C09J 4/00* | (2006.01) | |
| *C08F 20/34* | (2006.01) | |
| *C08F 120/34* | (2006.01) | |
| *C08F 20/00* | (2006.01) | |
| *C08F 222/34* | (2006.01) | |
| *C08F 22/32* | (2006.01) | |
| *C09J 11/06* | (2006.01) | |

(52) U.S. Cl.
CPC .......... *C08F 120/34* (2013.01); *C08F 20/00* (2013.01); *C08F 20/34* (2013.01); *C08F 22/32* (2013.01); *C08F 222/34* (2013.01); *C09J 4/00* (2013.01); *C09J 11/06* (2013.01)

(58) Field of Classification Search
CPC ........ C08F 20/00; C08F 20/34; C08F 120/34; C08F 222/34; C08F 22/32; C09J 4/04
USPC .......................... 526/298; 156/331.8; 524/555
See application file for complete search history.

(56) References Cited

U.S. PATENT DOCUMENTS

| | | | |
|---|---|---|---|
| 3,832,334 A | 8/1974 | O'Sullivan et al. | |
| 3,975,422 A | 8/1976 | Buck | |
| 4,012,402 A | 3/1977 | Buck | |
| 4,041,063 A * | 8/1977 | Buck | ............. 558/442 |
| 4,136,138 A * | 1/1979 | Dombroski et al. | ........... 525/265 |
| 4,196,271 A | 4/1980 | Yamada et al. | |
| 4,450,265 A | 5/1984 | Harris | |
| 4,490,515 A | 12/1984 | Mariotti et al. | |
| 4,532,293 A | 7/1985 | Ikeda et al. | |
| 4,556,700 A | 12/1985 | Harris et al. | |
| 4,560,723 A | 12/1985 | Millet | |
| 4,622,414 A | 11/1986 | McKervey | |
| 4,636,539 A | 1/1987 | Harris et al. | |
| 4,695,615 A | 9/1987 | Leonard et al. | |
| 4,718,966 A | 1/1988 | Harris et al. | |
| 4,837,260 A | 6/1989 | Sato et al. | |
| 4,855,461 A | 8/1989 | Harris | |
| 4,906,317 A | 3/1990 | Liu | |
| 5,288,794 A | 2/1994 | Attarwala | |
| 5,312,864 A | 5/1994 | Wenz et al. | |
| 5,530,037 A | 6/1996 | McDonnell et al. | |
| 6,096,848 A | 8/2000 | Gololobov et al. | |
| 6,294,629 B1 * | 9/2001 | O'Dwyer et al. | ............. 526/297 |
| 6,607,632 B1 | 8/2003 | McDonnell et al. | |
| 2006/0241226 A1 * | 10/2006 | Bachon et al. | ............... 524/315 |
| 2007/0137784 A1 * | 6/2007 | McDonnell | ................ C09J 5/00 156/293 |
| 2011/0151243 A1 * | 6/2011 | McArdle et al. | ........... 428/319.7 |

FOREIGN PATENT DOCUMENTS

WO    WO 2010/091975    8/2010

OTHER PUBLICATIONS

H.V. Coover, D.W. Dreifus and J.T. O'Connor, "Cyanoacrylate Adhesives" in *Handbook of Adhesives*, 27, 463-77, I. Skeist, ed., Van Nostrand Reinhold, New York, 3rd ed. (1990).

G.H. Millet, "Cyanoacrylate Adhesives" in *Structural Adhesives: Chemistry and Technology*, S.R. Hartshorn, ed., Plenun Press, New York, p. 249-307 (1986).

Mikuni, Hiroyuki, Three Bond Technical News (vol. 2), Issue 34, Issued on Jun. 20, 1991, pp. 1-2.

\* cited by examiner

*Primary Examiner* — Ling Choi
*Assistant Examiner* — Chun-Cheng Wang
(74) *Attorney, Agent, or Firm* — Steven C. Bauman (57) ABSTRACT

This invention relates to cyanoacrylate-containing compositions, which when cured provide improved heat resistance.

10 Claims, 8 Drawing Sheets

CYANOACRYLATE COMPOSITIONS

BACKGROUND

Field

This invention relates to cyanoacrylate-containing compositions, which when cured provide improved heat resistance.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

In the past, efforts have been made to improve the heat resistance of cured products of cyanoacrylate composition, particularly upon exposure to temperatures of 80° C. and greater. As the cured products are thermoplastic in nature they tend to soften as the temperature increases and when the $T_g$ of the material is surpassed the cured product begins to flow. As the temperature increase progresses, a degradation begins and the physical properties deteriorate. As a result, commercial applications for cyanoacrylates where exposure to elevated temperature conditions is likely have proven tricky and consequently have been limited.

Attempts to remedy this situation have been undertaken in the past.

For instance, U.S. Pat. No. 5,288,794 (Attarwala) is directed to an improved cyanoacrylate monomer adhesive formulation, where an effective amount, for enhancing the thermal resistance of the polymerized adhesive, of a mono, poly or hetero aromatic compound characterized by at least three substitutions on an aromatic ring thereof, two or more of the substitutions being electron withdrawing groups, is provided. Examples of the aromatic compound are given as 2,4-dinitrofluorobenzene; 2,4-dinitrochlorobenzene; 2,4-difluoronitrobenzene; 3,5-dinitrobenzonitrile; 2-chloro-3,5-dinitrobenzonitrile; 4,4'-difluoro-3,3'-dinitrophenyl sulfone; pentafluoronitrobenzene; pentafluorobenzonitrile; α,α,α-2-tetrafluoro-p-tolunitrile and tetrachloroterphthalonitrile.

Prior to the discovery in the '794 patent, numerous attempts have been made to improve the thermal stability of cyanoacrylate adhesive bonds.

For instance, U.S. Pat. No. 3,832,334 is directed to the addition of maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from the composition, under exposure to moisture or elevated temperature. The effective amount is reported as 0.1% to 5.0%, such as 0.3% to 0.7%, by weight of the composition. The '265 patent reports the superiority of phthalic anhydride over compositions where no additive was used, and where maleic anhydride was used (though less pronounced in the case of stainless steel lap shears than in those of aluminium).

U.S. Pat. No. 4,532,293 is directed to the use of benzophenonetetracarboxylic acid or its anhydride to provide a superior heat resistance for cyanoacrylate adhesives.

U.S. Pat. No. 4,490,515 is directed to cyanoacrylate compositions containing certain maleimide or nadimide compounds to improve hot strength properties.

U.S. Pat. No. 4,560,723 describes certain cyanoacrylate adhesives containing a certain treated copolymer toughener, and a "sustainer" compound having certain compatibility properties said to provide improved retention of toughness on heat aging of the cured adhesive. Various substituted aryl compounds are identified as suitable "sustainers," including nitrobenzene, 1,2-dichlorobenzene, 1,2,4-trichlorobenzene and bromochlorobenzene.

One way to improve thermal stability without resorting to additive chemistry involves the use of an allyl-2-cyanoacrylate, in whole or in part, as the cyanoacrylate component. It is believed that allyl-2-cyanoacrylate will undergo a cross-linking reaction through the allyl functional groups, once given a post-bake (either as an additional process step or as a result of the environment in which they are used) after the initial cure occurs.

Figure 1:
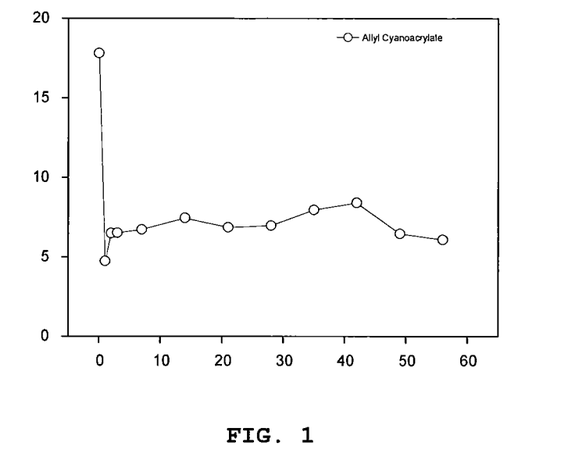
FIG. 1 shows an X-Y plot of thermal performance of allyl-2-cyanoacrylate on grit blasted mild steel, after aging at a temperature of 150° C. On the plot, X is time (days) and Y is bond strength [N/mm$^2$].
Figure 2A:
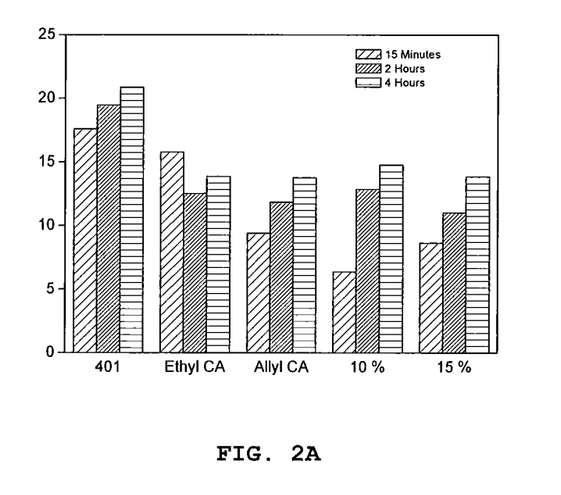
FIGS. 2A and 2B show in a bar chart format hot strength (at a temperature of 120° C. and 150° C.), respectively, of LOCTITE 401, ethyl-2-cyanoacrylate, allyl-2-cyanoacrylate and ethyl-2-cyanoacrylate containing 10 and 15 wt % of 1,8-octanediol bis-cyanoacrylate where the three time elements are given in the legend.
Figure 2B:
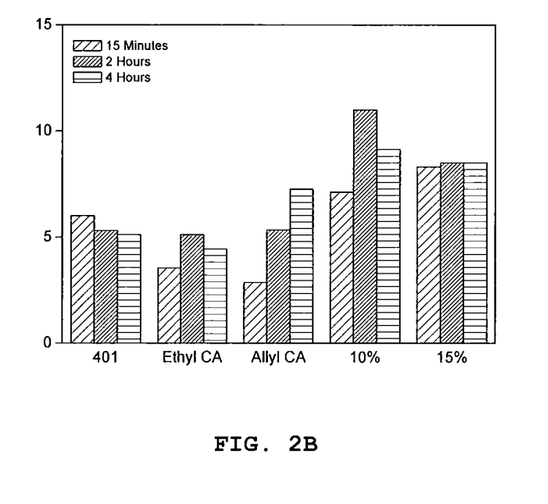
Figure 2C:
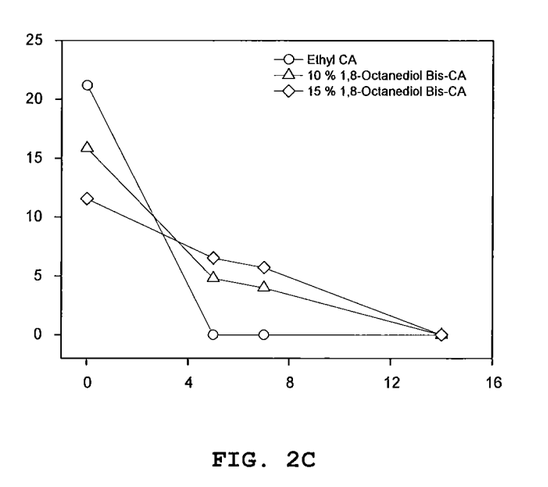
FIG. 2C shows an X-Y plot of thermal durability (at a temperature of 150° C.) of ethyl-2-cyanoacrylate (represented by the open circle), and ethyl-2-cyanoacrylate containing 10 (represented by the open triangle) and 15 wt % of 1,8-octanediol bis-cyanoacrylate (represented by the open diamond). On the plot, Y is bond strength [N/mm$^2$].
Figure 3:
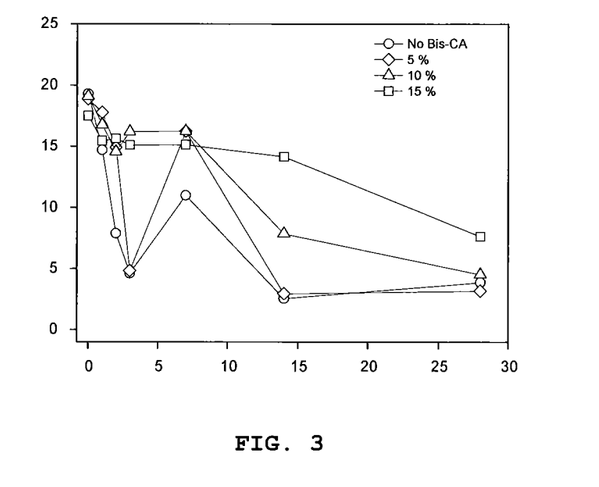
FIGS. 3-6 show X-Y plots of bond strength retention over time (in days) at successively greater elevated temperatures (120° C., 150° C., 180° C., and 200° C., respectively) of formulations prepared from a mono-functional cyanoacrylate (allyl-2-cyanoacrylate) and a multi-functional cyanoacrylate (1,6-hexanediol bis-cyanoacrylate, at progressively greater levels with the open diamond representing 5%, the open triangle representing 10% and the open square representing 15%) compared with a control (without the bis-cyanoacrylate, represented by the open circle) on grit blasted mild steel substrates. On the plots, Y is bond strength [N/mm$^2$].
Figure 4:
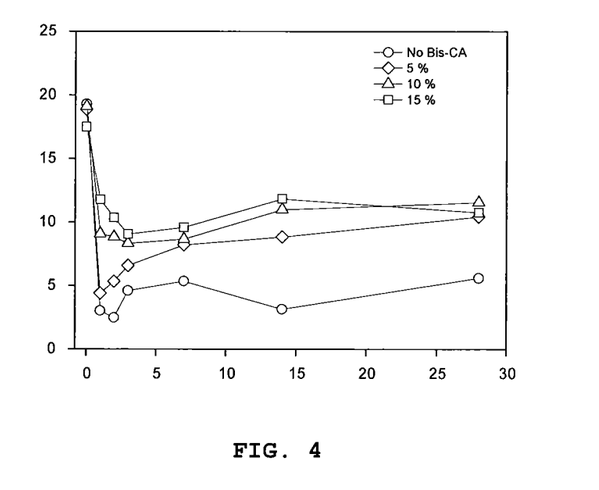
Figure 5:
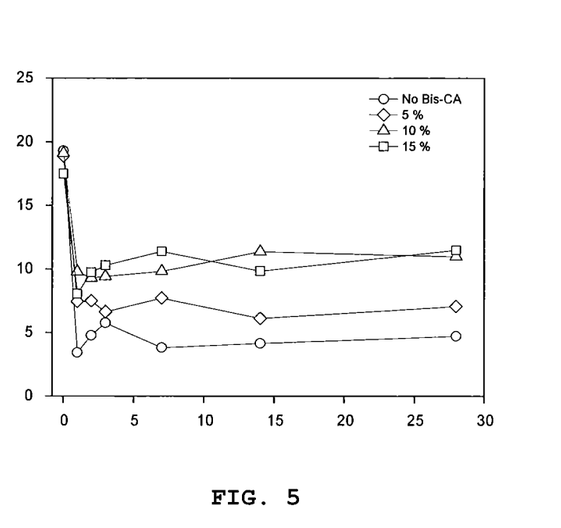
Figure 6:
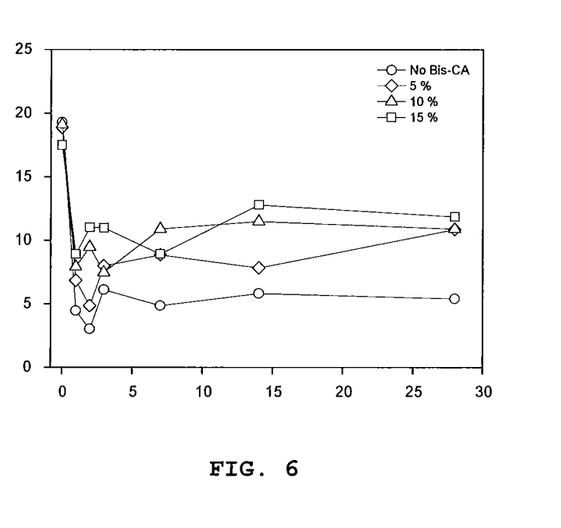
Figure 7:
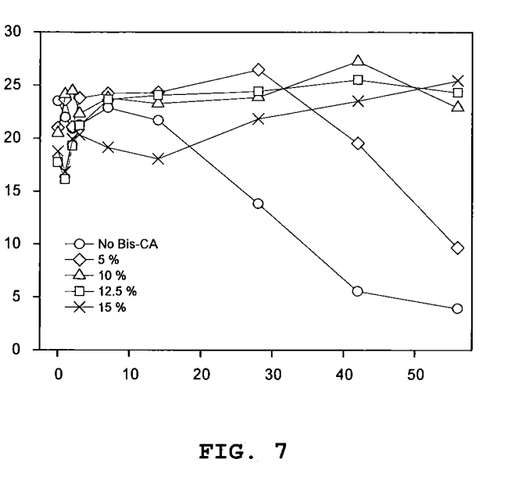
FIGS. 7-10 show X-Y plots of bond strength retention over time (in days) at successively greater elevated temperatures (120° C., 150° C., 180° C., and 200° C., respectively) of rubber toughened formulations prepared from allyl-2-cyanoacrylate/ethyl-2-cyanoacrylate as the mono-functional cyanoacrylate and a multi-functional cyanoacrylate (1,6-hexanediol bis-cyanoacrylate, at progressively greater levels with the open diamond representing 5%, the open triangle representing 10%, the open square representing 12.5%, and the X representing 15%) compared with a control (without the bis-cyanoacrylate, represented by the open circle) on grit blasted mild steel substrates. On the plots, Y is bond strength [N/mm$^2$].
Figure 8:
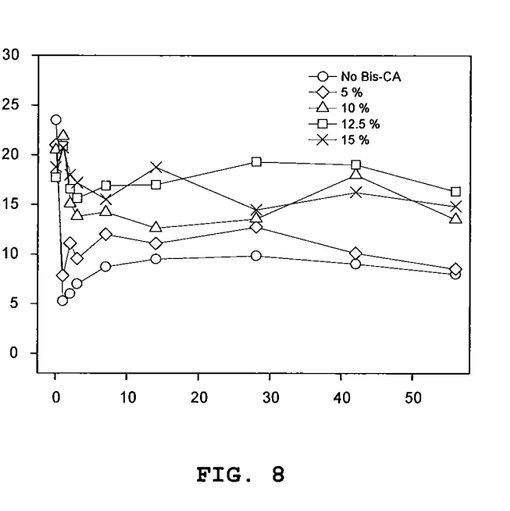
Figure 9:
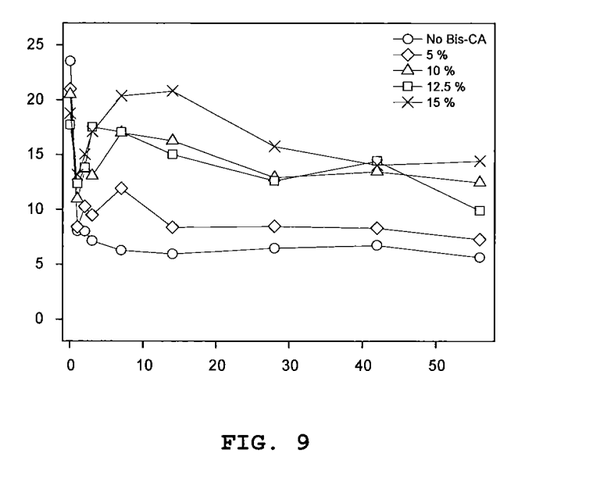
Figure 10:
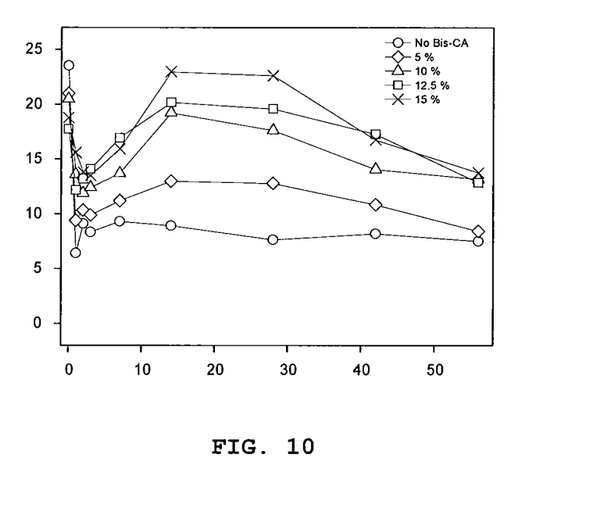

While the application of a post-bake certainly provides an allyl-2-cyanoacrylate-containing adhesive with significant improvements in thermal durability (see FIG. 1), post-bake processing is not devoid of its own issues. For instance, the additional step of a post-bake requires added labor, time and expense to the process. And, a post-bake results in a considerable loss in initial performance while the cross-links are being formed thermally. This loss is referred to as "the dip", with bond strength recovery occurring after approximately one week at a temperature of 150° C. (See FIG. 1.)

Despite these efforts, there has been a long standing, but unmet, desire to achieve more robust thermal performance from cyanoacrylate compositions. It would accordingly be quite advantageous to provide a solution to that desire.

SUMMARY

The present invention remedies the shortcomings on thermal performance of cyanoacrylate compositions by providing a cyanoacrylate composition, which when cured provides improved heat resistance, through broadly speaking the combination of (a) a mono-functional cyanoacrylate component and (b) a multi-functional cyanoacrylate component.

This invention is also directed to a method of bonding together two substrates, which method includes applying to at least one of the substrates a composition as described above, and thereafter mating together the substrates.

In addition, the present invention is directed to reaction products of the inventive compositions.

Also, the invention is directed to a method of preparing the inventive compositions.

The invention will be more fully understood by a reading of the section entitled "Detailed Description of the Invention", which follows.

DETAILED DESCRIPTION

As noted above, this invention is directed to a cyanoacrylate composition, which when cured provides improved heat resistance.

The cyanoacrylate component includes at least one mono-functional cyanoacrylate monomer which may be chosen with a raft of substituents, such as those represented by H$_2$C=C(CN)—COOR, where R is selected from C$_{1-15}$ alkyl, alkoxyalkyl, cycloalkyl, alkenyl, aralkyl, aryl, allyl and haloalkyl groups. Desirably, the cyanoacrylate monomer is selected from at least one, desirably at least two, of methyl cyanoacrylate, ethyl-2-cyanoacrylate, propyl cyanoacrylates, butyl cyanoacrylates (such as n-butyl-2-cyanoacrylate), octyl cyanoacrylates, allyl-2-cyanoacrylate, β-methoxyethyl cyanoacrylate and combinations thereof. A particularly desirable mono-functional cyanoacrylate monomer includes allyl-2-cyanoacrylate. A particularly desirable combination of mono-functional cyanoacrylate monomers includes allyl-2-cyanoacrylate together with an alkyl cyanoacrylate, such as ethyl-2-cyanoacrylate.

The mono-functional cyanoacrylate component should be included in the compositions in an amount within the range of from about 50% to about 99.98% by weight, with the range of about 70% to about 85% by weight, of the total composition being desirable.

In addition to the mono-functional cyanoacrylate component is a multi-functional cyanoacrylate component. Multi-functional cyanoacrylate components are ordinarily bis-cyanoacrylates, but may be tri-functional, tetra-functional or penta-functional as well.

Bis-cyanoacrylates are embraced by structure I where R in structure I is a linkage selected from (CH$_2$)$_n$, with n being 2, 3, 4, 5, 6, 8, 9, 10, or 12, such as a linear or branched chain alkylene. Bis-cyanoacrylates of this sort may be prepared through a transesterification reaction using an appropriate diol to yield the alkylene center segment for "R". Desirable examples of these bis-cyanoacrylates include 1,10-decanediol bis-cyanoacrylate, 1,8-octanediol bis-cyanoacrylate, and 1,6-hexane bis-cyanoacrylate. An appropriate synthetic method to yield such bis-cyanoacrylates may be found generally in U.S. Pat. No. 3,975,422 (Buck), U.S. Pat. No. 4,012,402 (Buck), and U.S. Pat. No. 6,096,848 (Gololobov), and International Patent Publication No. WO 2010/091975.

The multi-functional cyanoacrylate component should be included in the compositions in an amount within the range of from about 5% to about 30% by weight, with the range of about 10% to about 20% by weight, of the total composition being desirable.

Accelerators may also be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known and are reported in the patent literature. See e.g. U.S. Pat. Nos. 4,556,700, 4,622,414, 4,636,539, 4,695,615, 4,718, 966, and 4,855,461, the disclosures of each of which are hereby expressly incorporated herein by reference.

For instance, as regards calixarenes, those within the following structure are useful herein:

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated herein by reference.

Of the silacrowns, again many are known, and are reported in the literature.

Specific examples of silacrown compounds useful in the inventive compositions include:

dimethylsila-11-crown-4;

dimethylsila-14-crown-5;

and dimethylsila-17-crown-6.

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin would be appropriate choices as an accelerator component.

For instance, poly(ethylene glycol) di(meth)acrylates suitable for use herein include those within the following structure:

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are incorporated herein by reference.

Other additives may be included in the inventive cyanoacrylate compositions, such as certain acidic materials (like citric acid), thixotropy or gelling agents, thickeners, dyes, and combinations thereof.

In another aspect of the invention, there is provided a method of bonding together two substrates, which method includes applying to at least one of the substrates a composition as described above, and thereafter mating together the substrates for a time sufficient to permit the adhesive to fixture. For many applications, the substrate should become fixed by the inventive compositions in less than about 150 seconds, and depending on the substrate as little as about 30 seconds.

In yet another aspect of the invention, there are provided cured products of the so-described compositions.

In still another aspect of the invention, there is provided a method of preparing the so-described compositions. The method includes providing a mono-functional cyanoacrylate component, and combining therewith a multi-functional cyanoacrylate component.

The invention will be further illustrated by the examples which follow.

EXAMPLES

Synthesis

Initially, a series of bis-cyanoacrylates are synthesized, consistent with the procedure set forth on page 14 of International Patent Publication No. WO 2010/091975. Those bis-cyanoacrylates are: 1,6-hexanediol bis-cyanoacrylate, 1,8-octanediol bis-cyanoacrylate and 1,10-decanediol bis-cyanoacrylate.

Formulations

Cyanoacrylate compositions are prepared from a mono-functional cyanoacrylate component and a multi-functional cyanoacrylate component. In one sample, the mono-functional cyanoacrylate component is chosen to be allyl-2-cyanoacrylate and the multi-functional cyanoacrylate component is chosen to be 1,6-hexanediol bis-cyanoacrylate, a synthesis for which is described in the preceding paragraph.

In the table below, four samples (A-D) are prepared with the identified constituents in the noted amounts. In the Examples, "Mono CA" refers to mono-functional cyanoacrylate or a compound bearing a single cyanoacrylate group and "Multi CA" refers to multi-functional cyanoacrylate or a compound bearing more than one cyanoacrylate functional group.

| Constituents | | Sample/Amt. (wt %) | | | |
|---|---|---|---|---|---|
| Type | Identity | A | B | C | D |
| Mono CA | Allyl CA | 99.9 | 94.9 | 89.9 | 84.9 |
| Multi CA | Hex Diol Bis-CA | — | 5 | 10 | 15 |
| Accelerator | 18 Crown 6 | 0.1 | 0.1 | 0.1 | 0.1 |
| Stabilizer | BF$_3$ | 5 ppm | 5 ppm | 5 ppm | 5 ppm |

Each of Samples A-D is applied to grit blasted mild steel lap shears, and bonded assemblies prepared for thermal performance evaluation. Initially, a set of lap shear assemblies are aged at an elevated temperature of 120° C. Then the exposure temperatures are increased to 150° C., 180° C. and 200° C. Reference to FIGS. 3-6 shows that the use of a multi-functional cyanoacrylate, such as 1,6-hexanediol bis-cyanoacrylate, aids in minimizing the dip in allyl-2-cyanoacrylate compositions.

Next, the mono-functional cyanoacrylate component is chosen to be the combination of allyl-2-cyanoacrylate and ethyl-2-cyanoacrylate, and the multi-functional cyanoacrylate component was chosen to be 1,6-hexanediol bis-cyanoacrylate.

| Constituents | | Sample/Amt. (wt %) | | | | |
|---|---|---|---|---|---|---|
| Type | Identity | E | F | G | H | I |
| Mono CA | ECA | 44.95 | 42.45 | 39.95 | 38.70 | 37.45 |
| | Allyl CA | 44.95 | 42.45 | 39.95 | 38.70 | 37.45 |
| Multi CA | Hex Diol Bis-CA | 0 | 5 | 10 | 12.5 | 15 |
| Accelerator | 18 Crown 6 | 0.1 | 0.1 | 0.1 | 0.1 | 0.1 |
| Stabilizer | BF$_3$ | 10 ppm | 10 ppm | 10 ppm | 10 ppm | 10 ppm |
| Rubber Toughener | VAMAC VCS 5500 | 10 | 10 | 10 | 10 | 10 |

In the table above, five samples (E-I) are prepared, each with a VAMAC-branded elastomer as a rubber toughener.

Each of Samples E-I is applied to grit blasted mild steel lap shears, and bonded assemblies prepared for thermal performance evaluation. Initially, a set of lap shear assemblies are aged at an elevated temperature of 120° C. Then the exposure temperatures are increased to 150° C., 180° C. and 200° C. Reference to FIGS. 7-10 shows that the use of a multi-functional cyanoacrylate, such as 1,6-hexanediol bis-cyanoacrylate, aids in minimizing the dip in allyl-2-cyanoacrylate/ethyl-2-cyanoacrylate compositions, even when toughened, particularly with extended heat ageing even at temperatures of 200° C.

Figure 11:
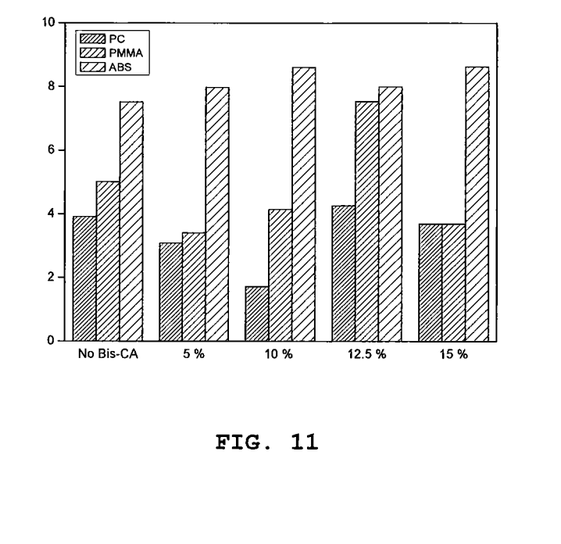
FIG. 11 shows in a bar chart format bonding performance in terms of tensile strength after a room temperature cure of 24 hours to various plastic substrates, for Samples E-I. The Y axis is measured in N/mm$^2$.

In addition, other performance evaluations, such as bonding to plastic substrates, were considered. As shown in the table below and with reference to FIG. 11, when applied to substrates constructed of polycarbonate ("PC"), polymethylmethacrylate ("PMMA") and acrylonitrile:butadiene:styrene ("ABS"), Samples E-I show the following performance in terms of tensile strength [N/mm$^2$] after a room temperature cure of 24 hours:

| | Sample | | | | |
|---|---|---|---|---|---|
| Substrate | E | F | G | H | I |
| Polycarbonate | 3.91 | 3.09 | 1.72 | 4.27 | 3.69 |
| Polymethylmethacrylate | 5.02 | 3.41 | 4.15 | 7.54 | 3.69 |
| Acrylonitrile:butadiene:styrene | 7.52 | 7.98 | 8.61 | 8.00 | 8.63 |

In the table below, four samples (J-M) are prepared, each with a PMMA elastomer as a thickener.

| Constituents | | Sample/Amt. (wt %) | | | |
|---|---|---|---|---|---|
| Type | Identity | J | K | L | M |
| Mono CA | ECA | 46.7 | 41.7 | 39.2 | 36.7 |
| | Allyl CA | 46.7 | 41.7 | 39.2 | 36.7 |
| Multi CA | Hex Diol Bis-CA | 0 | 10 | 15 | 20 |

-continued

| Constituents | | Sample/Amt. (wt %) | | | |
|---|---|---|---|---|---|
| Type | Identity | J | K | L | M |
| Accelerator | 18 Crown 6 | 0.1 | 0.1 | 0.1 | 0.1 |
| Stabilizer | BF$_3$ | 7 ppm | 7 ppm | 7 ppm | 7 ppm |
| Thickener | PMMA | 6.5 | 6.5 | 6.5 | 6.5 |

Figure 12:
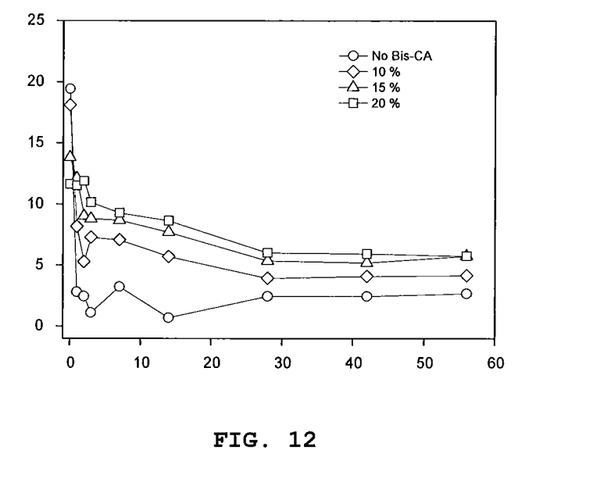
FIG. 12 show an X-Y plot of bond strength retention over time (in days) at an elevated temperature of 150° C. of formulations prepared from a mono-functional cyanoacrylate (allyl-2-cyanoacrylate) and a multi-functional cyanoacrylate (1,6-hexanediol bis-cyanoacrylate, at progressively greater levels with the open diamond representing 10%, the open triangle representing 15% and the open square representing 20%) compared with a control (without the bis-cyanoacrylate, represented by the open circle) on grit blasted mild steel substrates. On the plot, Y is bond strength [N/mm$^2$].

Each of Samples J-M is applied to grit blasted mild steel lap shears, and bonded assemblies prepared for thermal performance evaluation. A set of lap shear assemblies are aged at an elevated temperature of 150° C. Reference to FIG. 12 shows that the use of a multi-functional cyanoacrylate, such as 1,6-hexanediol bis-cyanoacrylate, aids in minimizing the dip in allyl-2-cyanoacrylate/ethyl-2-cyanoacrylate compositions, even when thickened with a PMMA.

Figure 13:
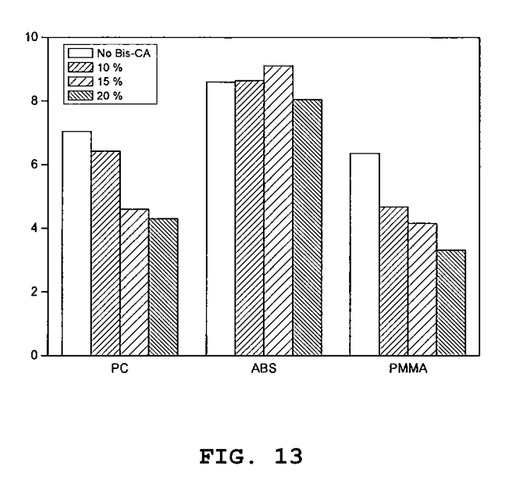
FIG. 13 shows in a bar chart format bonding performance in terms of tensile strength after a room temperature cure of 24 hours to various plastic substrates, for Samples J-M. The Y axis is measured in N/mm$^2$.

Next, the extent to which Samples J-M bonded together plastic substrates is evaluated. As shown in the table below and with reference to FIG. 13, when applied to substrates constructed of PC, PMMA and ABS, Samples J-M show the following performance in terms of tensile strength [N/mm$^2$] after a room temperature cure of 24 hours:

| | Sample | | | |
|---|---|---|---|---|
| Substrate | J | K | L | M |
| Polycarbonate | 7.05 | 6.43 | 4.60 | 4.31 |
| Polymethylmethacrylate | 6.36 | 4.68 | 4.17 | 3.32 |
| Acrylonitrile:butadiene:styrene | 8.60 | 8.65 | 9.11 | 8.05 |

What is claimed is:

1. A method of conferring improved thermal resistance to a cured product of a cyanoacrylate adhesive composition, comprising the steps of:
   providing a cyanoacrylate adhesive composition made from an allyl-2-cyanoacrylate and having added thereto in an amount of about 10 to about 20 weight percent based on the cyanoacrylate adhesive composition a bis-cyanoacrylate to form the cyanoacrylate adhesive composition;
   providing at least two substrates;
   dispensing the cyanoacrylate adhesive composition onto at least one of the substrates;
   joining the substrates in a mating relationship with the cyanoacrylate adhesive composition disposed therebetween and allowing the cyanoacrylate adhesive composition to cure thereby forming an assembly with the cured cyanoacrylate adhesive composition adhesively bonding together the two substrates; and
   exposing the assembly to elevated temperature conditions of at least 120° C., said cured cyanoacrylate adhesive composition having improved resistance to thermal degradation at that elevated temperature over an allyl-2-cyanoacrylate-containing cyanoacrylate adhesive composition without the added bis-cyanoacrylate.

2. The method according to claim 1, wherein the cyanoacrylate adhesive composition further comprises a member selected from the group consisting of methyl cyanoacrylate, ethyl-2-cyanoacrylate, propyl cyanoacrylates, butyl cyanoacrylates, octyl cyanoacrylates, and β-methoxyethyl cyanoacrylate.

3. The method according to claim 1, wherein the bis-cyanoacrylate is represented by structure I wherein R in structure I is a linkage selected from $(CH_2)_n$, with n being 2, 3, 4, 5, 6, 8, 9, 10, or 12.

4. The method according to claim 1, wherein the bis-cyanoacrylate is selected from the group consisting of 1,10-decanediol bis-cyanoacrylate, 1,8-octanediol bis-cyanoacrylate, and 1,6-hexanediol bis-cyanoacrylate.

5. The method according to claim 1, wherein the cyanoacrylate adhesive composition further comprises a stabilizing amount of an anionic stabilizer and a free radical stabilizer.

6. The method according to claim 1, wherein the cyanoacrylate adhesive composition further comprises an accelerator component.

7. The method according to claim 6, wherein the accelerator component is selected from the group consisting of calixarene, oxacalixarene, silacrown, cyclodextrin, crown ether, poly(ethyleneglycol) di(meth)acrylate, ethoxylated hydric compound, and combinations thereof.

8. The method according to claim 7, wherein the crown ether is selected from the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7 and combinations thereof.

9. The method according to claim 1, wherein the cyanoacrylate adhesive composition further comprises additives selected from the group consisting of tougheners, shock resistant additives, thixotropy conferring agents, thickeners, dyes, and combinations thereof.

10. A method of conferring improved thermal resistance to a cured product of a cyanoacrylate adhesive composition, comprising the steps of:
   dispensing a cyanoacrylate adhesive composition made from an allyl-2-cyanoacrylate and having added thereto in an amount of about 10 to about 20 weight percent based on the cyanoacrylate adhesive composition a bis-cyanoacrylate onto at least one substrate to which another substrate is joined in a mating relationship and allowing the cyanoacrylate adhesive composition to cure thereby forming an assembly with the cured cyanoacrylate adhesive composition adhesively bonding together the two substrates; and
   exposing the assembly to elevated temperature conditions of at least 120° C., said cured cyanoacrylate adhesive composition having improved resistance to thermal degradation at that elevated temperature over an allyl-2-cyanoacrylate-containing cyanoacrylate adhesive composition without the added bis-cyanoacrylate.

* * * * *